No. 766,133. PATENTED JULY 26, 1904.
J. W., F. T. & M. BAILEY.
TREATING THE RESIDUE RESULTING FROM MANUFACTURE
OF WHITE LEAD.
APPLICATION FILED OCT. 18, 1900.
NO MODEL.
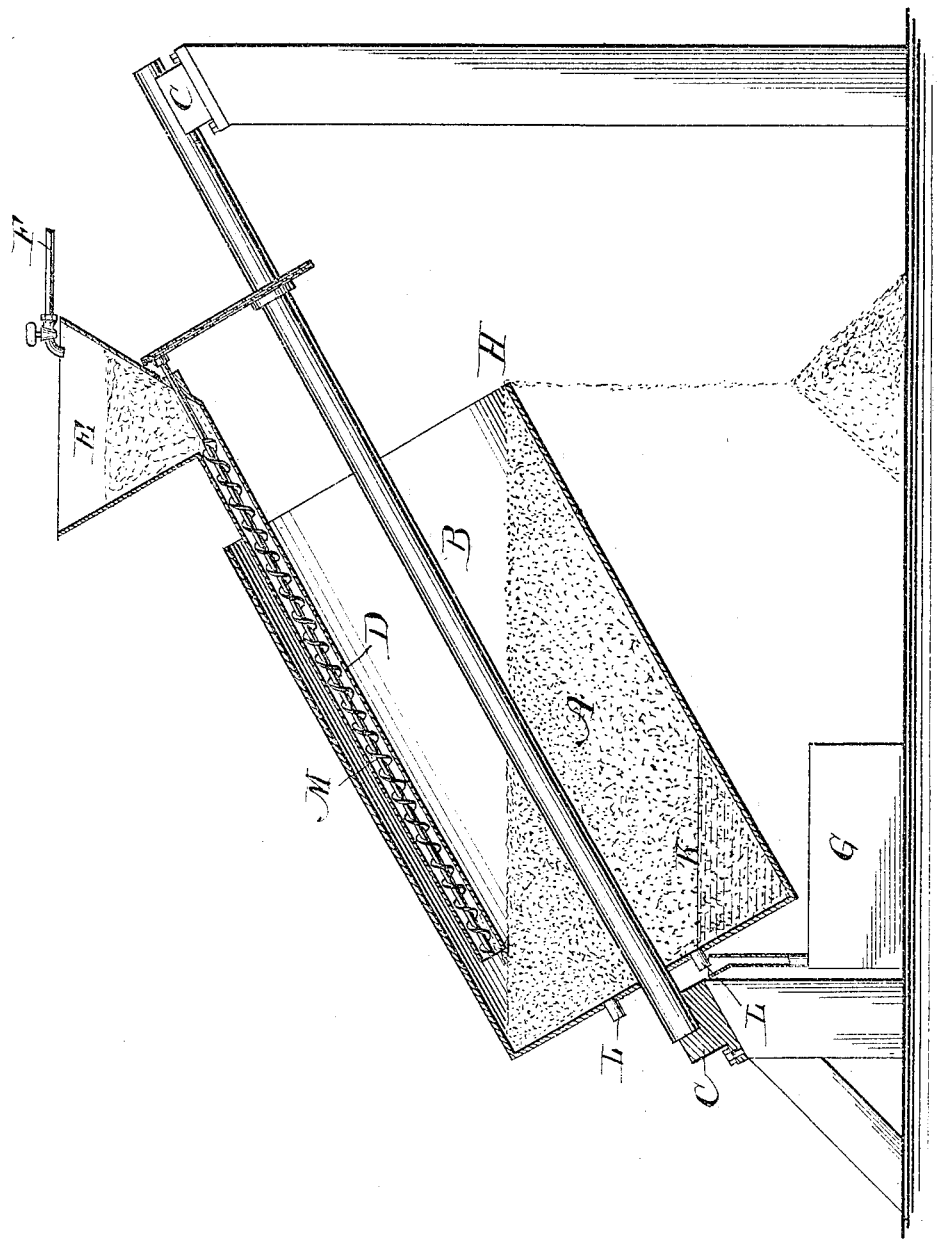
WITNESSES:
John O Kempler
Edwin Segur.
INVENTORS
John W. Bailey,
Frank T. Bailey,
Mark Bailey,
BY Kenyon & Kenyon,
ATTORNEYS No. 766,133. Patented July 26, 1904.

UNITED STATES PATENT OFFICE.

JOHN W. BAILEY, FRANK T. BAILEY, AND MARK BAILEY, OF JERSEY CITY, NEW JERSEY, ASSIGNORS, BY MESNE ASSIGNMENTS, TO UNITED LEAD COMPANY, A CORPORATION OF NEW JERSEY.

TREATING THE RESIDUE RESULTING FROM MANUFACTURE OF WHITE LEAD.

SPECIFICATION forming part of Letters Patent No. 766,133, dated July 26, 1904.

Application filed October 18, 1900. Serial No. 33,423. (No specimens.)

*To all whom it may concern:*

Be it known that we, JOHN W. BAILEY, FRANK T. BAILEY, and MARK BAILEY, citizens of the United States, and residents of Jersey City, county of Hudson, and State of New Jersey, have invented a certain new and useful Improvement in the Art of Treating the Residue Resulting from the Manufacture of White Lead, of which the following is a specification, reference being had to the accompanying drawing, forming a part hereof.

Our invention consists in a method of treatment of the waste products of lead, such as are formed in the manufacture of white lead by the corroding process.

The object of the invention is to convert these waste products into valuable by-products instead of converting them back into metallic lead, as is usually done at great cost of time and money.

In the old Dutch process of corrosion the uncorroded parts of the "buckles" are composed in the most part of metallic lead amounting in quantity to about thirty or forty per cent. of the amount of lead originally treated. These uncorroded parts not being in a comminuted condition are not valuable for further treatment other than for further corrosion or remelting into pig-lead or new buckles.

In the more modern processes of quick corrosion, in which the lead when treated in the corroding process is in the form of fiber or some other finely-comminuted condition, the residue left from washing the corroded stock is by no means as great as it is in the old Dutch process; but it is nevertheless an important fraction of the stock under treatment.

The waste products resulting from the corrosion of lead by either process consist of a mixture of lead carbonate, lead oxid, lead acetate, and fine metallic particles.

Our invention consists first in the process of treating these waste products, which consists in alternately moistening the particles forming the said products with acetic acid and exposing them to suitable corroding-gases, as the oxygen and carbonic acid of the air, and at the same time causing the particles to move upon themselves, so as to cause an attrition of said particles, as a result of which the lead oxid and the metallic lead in these waste products are converted almost entirely into a solution of acetate of lead, the carbonate being left in a pure condition, and then separating the acetate solution from the carbonate. In the best form of our process the solution of acetate of lead is continually drawn off at one point and the carbonate of lead is continually removed at another point, the process being thus made an uninterrupted or self-acting one.

Our invention also consists in the process of treating these waste products, which are composed mainly of carbonate of lead, oxid of lead, and metallic lead, which process consists in revolving the mass of waste products so as to produce attrition of the particles, causing the particles at one part of their revolution to pass through a solution of acetic acid and at another part of their revolution to be exposed to the air, whereby the metallic portion of the products are converted into soluble acetate of lead, and then separating the acetate solution from the carbonate. In the best form of the process the waste products are caused to alternately pass through the body of acetic acid at the lower part of their revolution and to be exposed to the air at the upper part of their revolution, and the dissolved acetate of lead is caused to continuously flow off from the lower part of the mass when it reaches a predetermined level, and the carbonate of lead is continuously removed from the top of the mass, and fresh quantities of the waste products and of the acetic acid are continuously supplied as may be needed. Our process also consists in certain other features and steps hereinafter described and claimed.

In the accompanying drawing is shown an apparatus which is specially adapted for carrying out our improved process.

In this drawing, A is an inclined cylinder open or partly open at the upper end and supported on the shaft B, which is adapted to revolve in the inclined boxes C C.

D is a feed-pipe extending from the bottom of the hopper E to a point near the bottom of the cylinder. Inside of the tube D is a screw M, adapted to be revolved by any suitable means.

F is a pipe opening into the hopper E and provided with any suitable form of regulating-valve. This pipe is adapted to continuously supply the acetic acid from any suitable source. The lower part of the cylinder is provided with openings or outlets L L, as shown, for the purpose of allowing the solution of acetate of lead to escape when it reaches a certain level in the cylinder. G is any suitable receptacle in which this acetate of lead can be collected.

The waste products are put in the hopper E and are continuously fed into the cylinder A through the pipe D by means of the revolving screw M. Acetic acid is supplied to the hopper E through the pipe F in suitably-regulated quantities and is thoroughly mixed with the waste products while passing through the pipe D by means of the screw M. We prefer to employ a solution of acetic acid and water of a strength sufficient to dissolve the oxid of lead and the metallic lead, but not to dissolve carbonate of lead to a material extent. A suitable strength of solution would consist of twelve and one-half per cent. of twenty-six per cent. acid. The waste products are supplied to the hopper E in sufficient quantities to fill the cylinder up to the level indicated at H and to keep the cylinder full to this level. A sufficient quantity of acetic acid is fed in to keep the acid which collects in the bottom of the cylinder up to the level indicated at K—that is to say, up to the level of the outlet L when at the lowest point in its revolution. As the products are fed into the cylinder every particle is wet or moist with the acetic-acid solution. In the upper part of the cylinder above the line K the particles are subjected to the oxidizing action of the air and the acid solution, every particle of waste products meanwhile being in constant motion, producing an attrition of the particles. The metallic portion is rapidly converted into soluble oxids of lead. The oxids and a very small portion of the carbonate are also dissolved by the acetic acid. This solution runs off through the outlets L when they are in the lowest part of their revolution and into the vessel G. As the mass continues to revolve the particles of lead and oxid which have not previously been converted into soluble acetate of lead are again wet or moistened by acetic acid in the bottom of the cylinder and are again exposed to the air in the upper part of the cylinder and are thereby converted into soluble acetate and are dissolved and flow off into the vessel G upon the further revolution of the cylinder. The tubes or outlets L L are preferably covered with a fine brass or other non-corrodible screen to prevent solid particles escaping into the vessel G. The undissolved and unmixed carbonate of lead being lighter than the other substances in the cylinder and being continuously displaced by the fresh quantities deposited in the lower end of the cylinder collects at the upper end thereof and is continuously discharged therefrom, as at H, in the manner illustrated, and then washed to free it from the remnants of acid, is dried, and is then a pure white lead of commercial value.

As already explained, the oxids and metallic particles escape as dissolved acetate of lead into the receptacle G. The solution fed through the pipe F can be so regulated as to produce a discharge into the passage G of a richness in acetate of lead from seventeen to twenty-two per cent. This solution, which is rich in lead, is then treated in the usual manner for converting the lead into commercial acetate of lead, or by using suitable precipitants into chromates, chlorids, sulfates, &c., or into "flake white," which is simply precipitated carbonate of lead.

The apparatus herein shown and described is not claimed herein, the same forming the subject-matter of another application, Serial No. 33,425, filed simultaneously herewith.

What we claim as new, and desire to secure by Letters Patent, is—

1. The process of treating the waste products of lead such as are formed in the manufacture of white lead by the corroding process, said waste products being composed mainly of carbonate of lead, oxid of lead and metallic lead, which consists in alternately moistening the said products with acetic acid and exposing them to suitable corroding-gases and at the same time causing the particles of which the products are composed to move upon themselves, whereby the metallic lead in the waste products is converted almost entirely into a solution of acetate of lead, then separating the acetate solution from the carbonate, substantially as set forth.

2. The process of treating the waste products of lead which are formed in the manufacture of white lead, and which are composed mainly of carbonate of lead, oxid of lead, and metallic lead, which process consists in moistening the particles forming the mixture with acetic acid of such strength that it will attack the oxid of lead and the metallic lead but not the carbonate, exposing the particles to the air, whereby some of the oxid of lead and of the metallic lead are converted into soluble acetate of lead, causing the particles to move upon themselves so as to produce attrition thereof, then treating the particles again with acetic acid, and then exposing them again to the air, meanwhile causing the particles to move upon themselves, whereby more of the oxid of lead and of the metallic lead are converted into soluble acetate of lead, and continuing this treatment until substantially all of the oxid and the metallic lead have been so converted, and then separating the solution of acetate of lead from the carbonate of lead, substantially as set forth.

3. The process of treating the waste products of lead which are formed in the manufacture of white lead, and which are composed mainly of carbonate of lead, oxid of lead, and metallic lead, which process consists in revolving the mass of waste products so as to produce attrition of the particles, causing them at one part of their revolution to pass through a body of acetic-acid solution, and at another part of their revolution to be exposed to the air, whereby the lead oxid and the metallic lead in the products are converted into soluble acetate of lead and separating the acetate solution from the carbonate, substantially as set forth.

4. The process of treating the waste products of lead which are formed in the manufacture of white lead, and which are composed mainly of carbonate of lead, oxid of lead, and metallic lead, which consists in revolving the mass of waste products so as to produce attrition of the particles, causing them at the lower part of their revolution to pass through a body of acetic acid, and at the upper part of their revolution to be exposed to the air whereby the lead oxid and the metallic lead in the products are converted into soluble acetate of lead, causing the dissolved acetate of lead to flow off from the lower part of the mass when it reaches a predetermined level, and removing the carbonate of lead from the top of the mass, and supplying fresh quantities of acetic acid as required, substantially as set forth.

5. The process of treating the waste products of lead which are formed in the manufacture of white lead, and which are composed mainly of carbonate of lead, oxid of lead, and metallic lead, which consists in feeding the waste products into a revolving vessel, maintaining a supply of acetic acid in the lower part of the vessel at a given level so that the products will come into contact with the acid, exposing the products to the action of the air at the upper part of the vessel, causing the dissolved acetate of lead to flow off from the vessel at the said level and causing the carbonate of lead to be automatically discharged from the top of the vessel, substantially as set forth.

6. The process of treating the waste products of lead which are formed in the manufacture of white lead, and which are composed mainly of carbonate of lead, oxid of lead, and metallic lead, which consists in feeding the waste products and a regulated quantity of acetic acid into a revolving vessel, maintaining a supply of acetic acid in the lower part of the vessel at a given level so that the products will come into contact with the acid, exposing the products to the action of the air at the upper part of the vessel, causing the dissolved acetate of lead to flow off from the vessel at the said level and causing the carbonate of lead to be automatically discharged from the top of the vessel, substantially as set forth.

7. The process of treating the waste products resulting from the manufacture of white lead by the corroding process, said waste products being composed mainly of carbonate of lead, oxid of lead and metallic lead, which process consists in alternately subjecting the products to the action of acetic acid and a suitable corroding-gas.

8. The process of treating the waste products resulting from the manufacture of white lead by the corroding process, said waste products being composed mainly of carbonate of lead, oxid of lead and metallic lead, which process consists in alternately subjecting the products to the action of acetic acid and air.

9. The process of treating the waste products resulting from the manufacture of white lead by the corroding process, said waste products being composed mainly of carbonate of lead, oxid of lead and metallic lead, which process consists in alternately subjecting the products to the action of acetic acid and a suitable corroding-gas, and causing the particles of which the products are composed to move upon themselves.

In testimony whereof we have signed our names to this specification in the presence of two subscribing witnesses.

JOHN W. BAILEY.
FRANK T. BAILEY.
MARK BAILEY.

Witnesses:
JOHN O. GEMPLER,
EDWIN SEGER.